United States Patent [19]

Suganuma et al.

[11] Patent Number: 4,958,712
[45] Date of Patent: Sep. 25, 1990

[54] WET CLUTCH DEVICE

[75] Inventors: Tatsumi Suganuma; Shigehiro Nozue; Tatsuhiko Fukuoka; Naoto Noguchi; Akira Takenaka, all of Toyota, Japan

[73] Assignee: Taiho Kogyo Co. Ltd., Toyota, Japan

[21] Appl. No.: 212,682

[22] Filed: Jun. 28, 1988

[30] Foreign Application Priority Data

Jun. 29, 1987 [JP] Japan .................................. 62-163177
Nov. 30, 1987 [JP] Japan .................................. 62-301938

[51] Int. Cl.⁵ .................................................. F16D 13/72
[52] U.S. Cl. ................................ 192/70.12; 192/70.28; 192/84 C; 192/113 B
[58] Field of Search ............... 192/70.28, 84 C, 113 B, 192/70.12, 112, 70.14

[56] References Cited

U.S. PATENT DOCUMENTS

| 754,291 | 3/1904 | Eastwood | 192/84 C |
|---|---|---|---|
| 2,884,107 | 4/1959 | Frankel | 192/113 B |
| 3,189,145 | 6/1965 | Marland et al. | 192/84 C |
| 3,584,720 | 6/1971 | Bark et al. | 192/70.28 |
| 3,912,060 | 10/1975 | Handke | 192/58 C |
| 4,011,930 | 3/1977 | Coons et al. | 192/113 B |
| 4,079,820 | 3/1978 | Mattli | 192/84 C |
| 4,437,555 | 3/1984 | Tomm et al. | 192/70.28 |
| 4,445,606 | 5/1984 | Van Laningham | 192/84 C |
| 4,466,524 | 8/1984 | Lane | 192/70.28 |
| 4,488,626 | 12/1984 | Handke | 192/70.12 |
| 4,519,373 | 5/1985 | Hardy et al. | 192/70.12 |
| 4,548,306 | 10/1985 | Hartz | 192/70.28 |
| 4,676,356 | 6/1987 | Beccaris et al. | 192/70.28 |

FOREIGN PATENT DOCUMENTS 28321  3/1981  Japan .............................. 192/113 B

*Primary Examiner*—Kenneth J. Dorner
*Assistant Examiner*—Brian K. Green
*Attorney, Agent, or Firm*—Sandler, Greenblum & Bernstein

[57] ABSTRACT

A wet clutch device for selectively transmitting the rotation of a rotatable pulley to a driven shaft which rotatably supports the pulley. The wet clutch device includes an oil chamber which encloses a predetermined amount of oil and which is defined by the pulley and a cover which is secured to the pulley, driving clutch plates which are axially movably supported by the pulley in the oil chamber, driven clutch plates which are axially movably supported by the driven shaft in the oil chamber to selectively come into engagement with, and disengagement from corresponding driving clutch plates, and actuating device for bringing the driving clutch plates and the driven clutch plates into engagement with each other.

32 Claims, 21 Drawing Sheets

WET CLUTCH DEVICE

BACKGROUND OF THE INVENTION

1. Field of the Invention

The present invention relates to a multiple wet clutch device and, more particularly, it relates to a multiple wet clutch device which can advantageously be used with an apparatus in which a drive shaft is driven through a pulley.

2. Description of Related Art

Generally speaking there are two types of clutch devices: wet type and dry type. The dry type of clutch is relatively small but has a number of drawbacks. The drawbacks include reduced (relative to wet type clutches) durability of the frictional portion of the clutch, tendency to produce large (relative to wet type clutches) noises and proclivity toward shock occurrence when the clutch is engaged. Further, in the dry type of clutch, foreign matter tends to penetrate into the areas between the clutch plates.

On the other hand, wet type clutches, that is, those types of clutches in which the clutch plates are disposed in oil, do not suffer the above-mentioned drawbacks to the same extent as the dry type clutches. More specifically, the frictional portion of a wet type clutch has high durability. Further, wet type clutches can be engaged and disengaged without causing much noise. However, because of their peculiar construction, it is difficult to make wet type clutches small. Wet type clutches have a large axial dimension. There are other problems. For example, during operation of a wet type clutch, it is difficult to cool the oil in which the clutch plates are immersed and it is also difficult to cool the coil which electromagnetically actuates the clutch. Accordingly, a need has arisen for a special cooling apparatus.

SUMMARY OF THE INVENTION

The primary object of the present invention is to provide a small and compact wet clutch device which retains all of the advantages of the conventional wet clutch, mentioned above.

Another object of the present invention is to provide a wet clutch device which can effectively radiate heat from oil and from the coil which electromagnetically actuates the clutch.

Still another object of the present invention is to provide a wet clutch device which has high abrasion resistance and high durability.

The improvement of the present invention is mainly directed to an existing pulley which is usually used as a drive shaft. Namely, according to one of the features of the present invention, the pulley itself forms a housing which defines an oil chamber.

To achieve the objects mentioned above, according to the present invention, there is provided a wet clutch device for selectively transmitting the rotation of a rotatable driving member, such as a pulley, to a rotatable driven member, such as a drive shaft which is rotatable relative to the pulley. The device includes an oil chamber which encloses therein a predetermined amount of oil. This oil chamber is defined by the pulley and a cover which is secured to the pulley; driving clutch plates which are axially movably supported by the pulley in the oil chamber; driven clutch plates which are axially movably supported by the driven shaft in the oil chamber to selectively come into engagement and disengagement from, the corresponding driving clutch plates; and an actuator for bringing the driving clutch plates and the driven clutch plates into engagement with each other.

BRIEF DESCRIPTION OF THE DRAWINGS

Other objects, advantages and novel features of the invention will become apparent from the following detailed description of the invention when considered in conjunction with the accompanying drawings within.

DETAILED DESCRIPTION OF THE INVENTION

Figure 1:
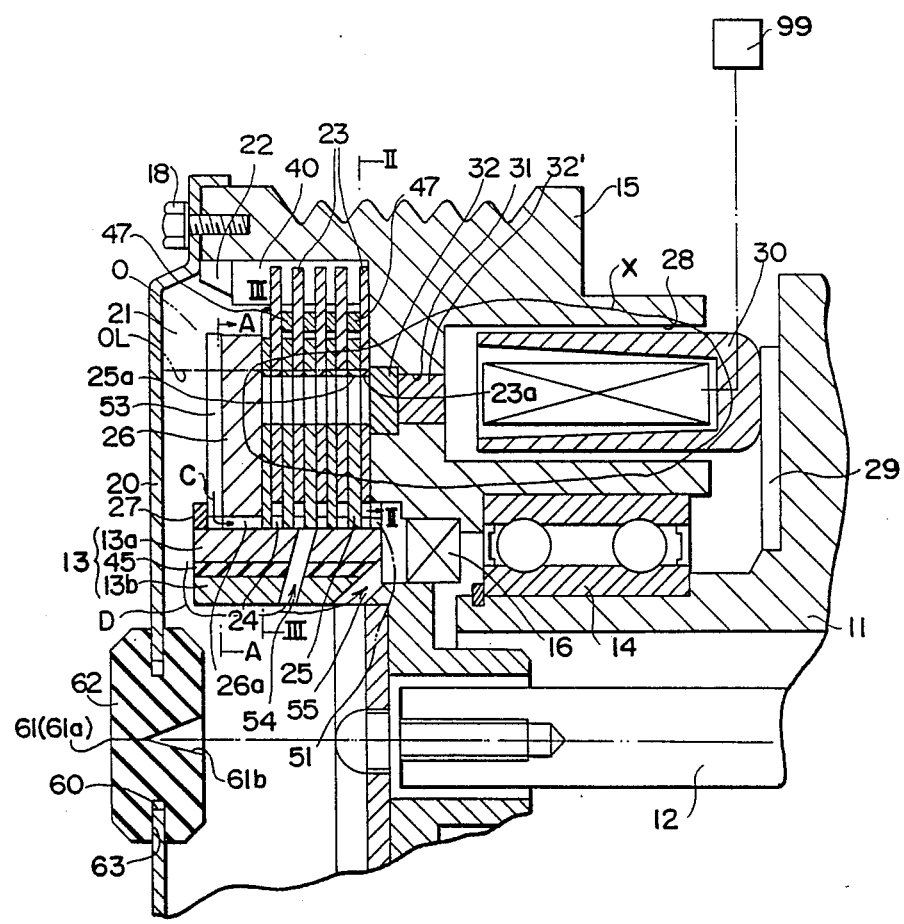
FIG. 1 is a cross sectional view of an upper half of a wet clutch device according to one aspect of the present invention.

With specific reference to FIG. 1, which shows an embodiment of a wet clutch device of the present invention applied to a compressor of a car cooler, a driven shaft 12, which is connected to the compressor, is rotatably supported by a housing 11. The driven shaft 12 has a hub 13 integrally keyed to one end of the shaft.

A pulley 15 which is provided on the outer periphery of the driven shaft 12 is rotatably supported by the housing 11 through a a bearing 14. An oil seal 16 is provided between pulley 15 and hub 13.

A cover 20; in, for example, the form of a circular plate; is secured to one side face of pulley 15 through set screws 18 to define an oil chamber 21, together with the pulley 15 and hub 13. Cover 20 has a sealing plug 62 which is detachably attached thereto to close the oil chamber 21.

As can be understood from the foregoing, the pulley 15 and the cover 20 constitute a driving side component unit (i.e., a driving member) and a driven shaft 12 and the hub 13 constitute a driven side component unit (i.e., a driven member). The wet clutch device is provided in the oil chamber 21 between the driving side and the driven side.

Figure 2:
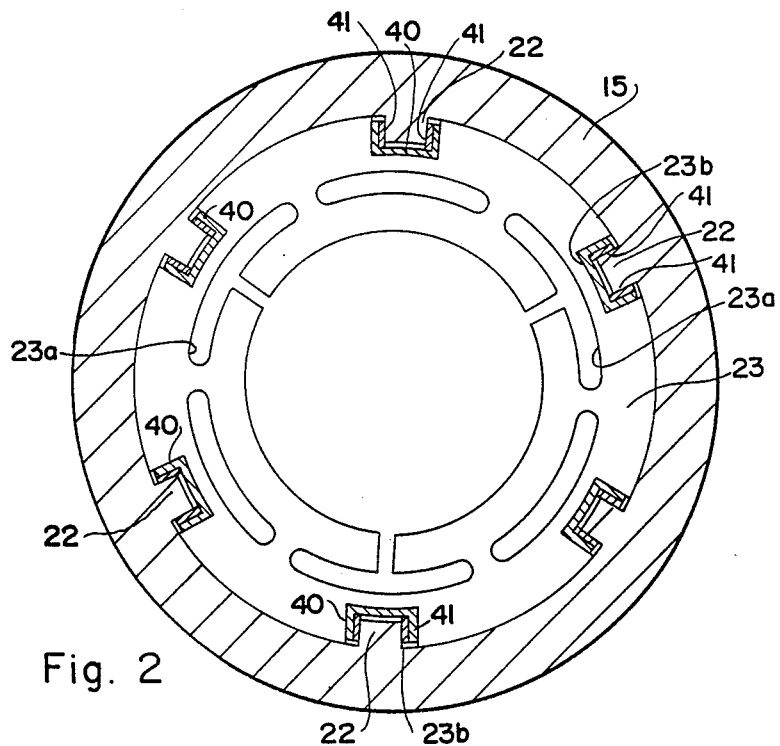
FIGS. 2 and 3, respectively, are sectional views taken along lines II—II and III—III in FIG. 1.

Pulley 15 is provided, on its inner end periphery adjacent to cover 20, with a plurality of axially extending radial projections 22 which define a sliding guide surface as shown in FIG. 2. Slide guide pieces 40 are fitted in radial axial projections 22. Slide pieces 40 are splined in radial grooves 23b of the clutch plates 23 on the driving side so as to move in the axial direction. The driving clutch plates 23 can rotate together with pulley 15.

Figure 4:
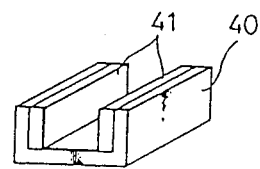
FIG. 4 is a perspective view of a sliding guide piece which guides clutch plates on the driving side.

The slide guide pieces 40, one of which is shown in FIG. 4, are made of a material having hardness and abrasion resistance substantially identical to that of the clutch plates 23 on the driving side. The slide guide pieces 40 are made of, for example, nitrided stainless steel which has relatively high abrasion resistance and hardness. On the inner surfaces of the slide guide pieces 40, in which the projections 22 are fitted, are attached cushion members 41, e.g., rubber members, which dampen the oscillation which causes fretting wear. The rubber members 41 can also be dispensed with , since the slide guide pieces 40 are immersed in oil chamber 21, so that an oil dampening effect can be expected.

Figures 5, 6:
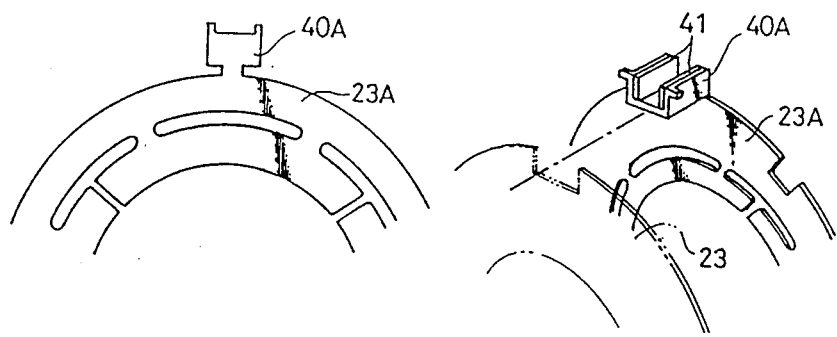
FIGS. 5 and 6, respectively, are a front elevational view and a perspective view of a sliding guide mechanism of the clutch plates on the driving side, according to another embodiment of the inventions.

FIGS. 5 and 6 show another embodiment of a slide guide piece 40A. In FIGS. 5 and 6, the slide guide pieces 40A are provided on one end of the clutch plates 23 on the driving side, so that the slide glide pieces 40A are fitted into the remaining clutch plates 23 for relative sliding movement. The innermost clutch plate 23A, which is located farthest from the cover 20 in oil chamber 21, is formed, on its outer periphery, with projections of a predetermined shape which are integrally molded with clutch plate 23A and which are bent to form slide guide pieces 40A. Onto the inner surfaces of the slide guide pieces 40A are attached cushion members 41, as in the embodiment shown in FIG. 4. The radial projections 22 of pulley 15 are fitted into the slide guide pieces 40A, and the remaining clutch plates 23 are slidably fitted into the slide guide pieces 40A. In the illustrated embodiment, a plurality of clutch plates 23 on the driving side can be subassembled, resulting in easy insertion of the slide guide pieces 40A into the radial projections 22 of pulley 15.

It should be noted that slide guide pieces 40 and 40A and the rubber members 41 mentioned above decrease fretting wear due to fine vibration. However, the elements, 40, 40A and 41, can be dispensed with.

Hub 13 is formed, on its outer end periphery adjacent to cover 20, with splines (axial projections 24 which are slidably fitted into corresponding spline grooves 25b formed in the annular clutch plates 25 on the driven side, so that the clutch plates 25 on the driven side rotate together with the hub 13 about their center axis.

Figure 3:
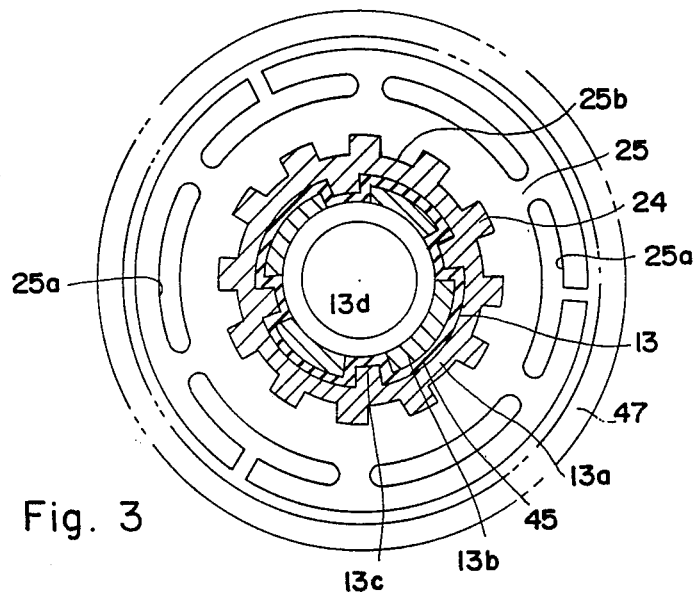

Hub 13 is split into two portions, i.e., an outer annular portion 13a and an inner annular portion 13b. Inner annular portion 13b is secured to the driven shaft 12 and is connected to the outer annular portion 13a . through an intermediate annular elastic member 45, formed of rubber or similar material. The outer and inner annular portions 13a and 13b have radial projections 13c, and corresponding recesses 13d, into which the radial projections 13c are fitted, to ensure transmission of rotation between the annular portion 13a and 13b, respectively. Preferably, more than two projections 13c and more than two recesses 13d are provided (four projections and recesses are shown in FIG. 3), but at least one projection 13c and at least one recess 13d can be provided. Rubber 45 can be secured to both the outer annular portion 13a and the inner annular portion 13b by vulcanization or press fit. The division of hub 13 into two portions contributes to a damped vibration which is transmitted to the driven shaft 12 and the clutch plates 25 and from those two elements back. Further, division of the hub into two portions helps prevent fretting wear due to fine vibration.

The driving clutch plates 23 and the driven clutch plates 25, which driven clutch plates 25 have a diameter smaller than that of the driving clutch plates 23, are alternately superimposed. An armature 26, which has spline grooves 26a into which the splines 24 are fitted, is supported by an external end of the clutch plate assembly so as to move in the axial direction. Numeral 27 (in FIG. 1) designates a stop ring which is mounted to hub 13 to prevent armature 26 from coming out of hub 13.

Pulley 15 has an annular channel 28 which opens at its end adjacent to housing 11 and which is aligned with clutch plates 23 and 25 and armature 26. In annular channel 28 is housed an electromagnetic actuator having a coil 30 which is connected to housing 11 by a bracket 29 and which is electrically connected to a power supply source 99. Pulley 15 has a magnetic path forming hole which defines a path of magnetic flux produced by coil 30 passing through clutch plates 23 and 25 and armature 26. The magnetic path forming hole 31 is closed at one end by a nonmagnetic cap 32 to seal the oil chamber 21. Further, hole 31 can be closed by seal member 32' made of synthetic resin to enhance the seal efficiency of the oil chamber 21. It should be noted that magnetic path forming holes 23a and 25a are formed in the clutch plates 23 and 25, which path forming holes 23a and 25a are aligned with magnetic path forming hole 31.

A perdetermined amount of oil is enclosed in oil chamber 21, which chamber is sealed by oil seal 16 and plug 62. When no power is supplied to coil 30, pulley 15, which is rotated by the engine, causes cover 20 and clutch plates 23 on the driving side to rotate together in the same direction. Since the coil 30 is not energized, armature 26 is not electromagnetically attracted and, therefore, a relative side rotation takes place between the clutch plates 23 on the driving side and the clutch plates 25 on the driven side. In other words, no rotation of the pulley 15 is transmitted to the hub 13 (and, accordingly, driven shaft 12) on the driven side.

When power is supplied to coil 30, a closed loop of magnetic flux designated by X (shown in FIG. 1) is formed in pulley 15, coil 30, clutch plates 23 on the drive side, clutch plates 25 on the driven side, and armature 26, so that armature 26 is attracted towards pulley 15. As a result, the clutch plates 23 and the clutch plates 25 are brought into press contact with each other by the magnetic attractive force, so that clutch plates 23 and 25 rotate together. Consequently, hub 13 and driven shaft 12 rotate together with clutch plates 25 in the same direction. Thus, a compressor (not shown) connected to the driven shaft 12 is rotated.

Since cover 20 which defines the oil chamber 21 rotates together with pulley 15, the oil chamber 21 also rotates. As a result, the oil penetrates into the space between the clutch plates 23 and 25 to lubricate those plates. The rotation of cover 20 assists in radiation of heat from oil in oil chamber 21. It is possible to provide heat radiation fins (not shown) on the outer face of cover 20 in order to enhance this heat radiation efficiency of the oil.

Since coil 30, which is provided outside oil chamber 21, is exposed to the atmosphere, its heat radiation efficiency is increased. It should be noted that in the conventional wet clutch, a coil (corresponding to coil 30 in the illustrated embodiment of the present invention) for actuating the clutch is enclosed in the oil chamber and, accordingly, a high radiation efficiency cannot be expected.

During the radiation of the driving side (pulley 15), the enclosed oil is collected in the outer circumferential portion of the oil chamber 21 due to the centrifugal force, so that a so-called "drag phenomenon" occurs due to the viscosity of the oil. Thus, in spite of disengagement of the wet clutch device, i.e., disconnected of the driving clutch plates from the driven clutch plates, the driven side elements (clutch plates 25 and so on) are rotated by the rotation of the driving side elements (clutch plates 23 and so on) resulting in production of an idle torque.

Figure 7:
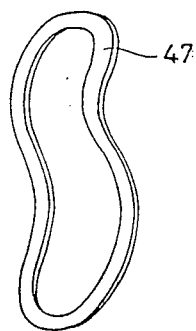
FIGS. 7 and 8 are perspective views of different spring means (biasing means) which are inserted between the clutch plates on the driving side.

To reduce such an idle torque, wave washers 47 are inserted between clutch plates 23 on the driving side and outside clutch plates on the driven side. The wave washers 47, which are in the shape of a wave in their free state (as shown in FIG. 7), normally serve as springs for separating the adjacent clutch plates 23 a predetermined distance. When clutch plates 23 come close to each other under the magnetic attactive force mentioned above, the wave washers 47 are substantially deformed into flat plates or slightly wave like plates, so that the clutch plates 23 on the driving side and the clutch plates 25 on the driven side can be brought into press contact with each other. The thickness of one wave washer 47 is smaller than the thickness of one clutch plate 25 on the driven side.

Figure 8:
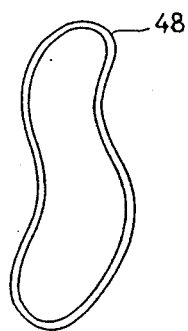

The wave washers 47 can be replaced with annular wave wires 48 which function similarly to the wave washers and which are shown in FIG. 8.

Figure 9:
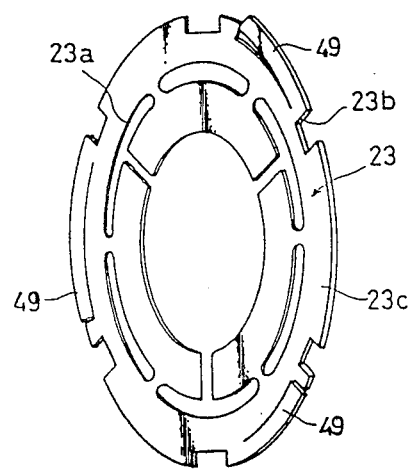
FIGS. 9 and 10, respectively, are a perspective view and a partial front elevational view of spring means inserted between the clutch plates on the driving side, according to another embodiment of the present invention.
Figure 10:
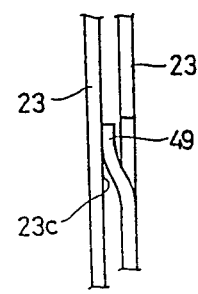

FIGS. 9 and 10 show a variant of the spring means, this means corresponding to the wave washers 47 or the annular wave wires 48 of the above-mentioned embodiments.

In the variant shown in FIGS. 9 and 10, the clutch plates 23 on the driving side are provided, on their outer peripheries, with a plurality of (preferably more than three) bent pieces 49 which are formed integrally with clutch plates 23 by cutting and binding parts of the associated clutch plates and which are located outside clutch plates 25 on the driven side. In their free states, bent pieces 49, which are elastically deformable, elastically come into contact with corresponding flat portions 23c of the adjacent clutch plates 23 on the driving side to separate the adjacent clutch plates 23. When the clutch plates 23 are pressed against each other due to the magnetic attractive force, the bent pieces 49 are elastically deformed, so that they are partially or completely brought into planes of the associated clutch plates 23. In other words, when coil 30 is energized, the clutch plates 23 can be brought into press contact with the clutch plates 25 by elastic deformation of the bent pieces 49.

Figure 11:
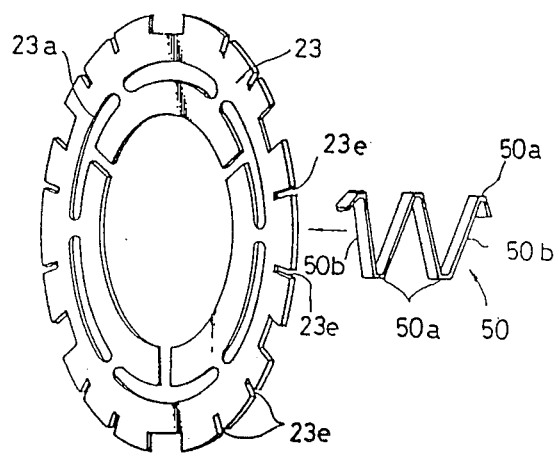
FIGS. 11 and 12, respectively, are a perspective view and a partial front elevational view of a spring means inserted between the clutch plates on the driving side, according to still another embodiment of the present invention.
Figure 12:
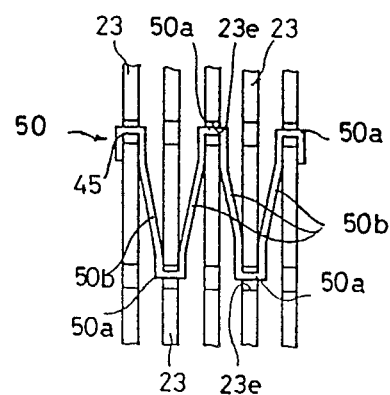

FIGS. 11 and 12 show still another embodiment of spring means. This means is in the form of connecting springs 50 which can make a subassembly of clutch plates 23. The connecting springs are made of elongated leaf springs which are successively and alternatively bent into a zigzag shape and which have a thickness smaller then the thickness of the clutch plates 25 on the driven side. The apexes of the bent connecting springs 50 form abutment portions 50a which can engage corresponding engagement grooves 23e formed on the peripheries of the clutch plates 23. The portions of the connecting springs 50 between the apexes 50a form springy connecting portions 50b which are functionally equivalent to the bent springy portions 49 shown in FIGS. 9 and 10. The abutment portions (apexes) 50a of the connecting springs 50 are fitted into the engagement grooves 23e of the adjacent clutch plates 23 at different circumferential phases, i.e., at different angular positions of the adjacent clutch plates 23. The springy connecting portions 50b of the connecting spring 50 act as a spring force on the adjacent clutch plates 23 so as to separate the same. The clutch plates 23 on the driving side can be united into a subassembly by connecting springs 50.

Preferably, more than three connecting springs 50 are provided on the peripheries of the clutch plates 23 at an equiangular distance, so that the clutch plates 23 on the driving side are stably united into a sub-assembly, as mentioned above. Having such a subassembly makes the assembly of the clutch device easier.

When coil 30 is not energized, the connecting portions 50b separate the adjacent clutch plates 23 from one another. When coil 30 is energized, the connecting portions 50b are elastically deformed by the displacement of the clutch plates 23 due to the magnetic attractive force, so that the springy connecting portions 50b lie in planes including the associated clutch plates 25, within the thickness of the clutch plates 23. In other words, the elastic deformation of the connecting portions 50b of the connecting springs 50 makes it possible to bring the clutch plates 23 into close contact with clutch plates 25.

For easy assembly of the clutch device, armature 26 is first fitted onto hub 13, which has stop ring 27 secured in advance and then clutch plates 23 on the driving side, clutch plates 25 on the driven side, and wave washers 40 (or wave wires 41), are alternately fitted onto hub 13. After that, a stop washer 51 (shown in FIG. 1) is attached to hub 13. After that, the subunit thus formed is attached to pulley 15. When connecting springs 50 are used, the apexes 50a of the connecting springs 50 are engaged in the engagement grooves 23e of the clutch plates 23 of the subunit mentioned above. The radial grooves 23b of the clutch plates 23 are aligned by connecting springs 50.

Figure 13:
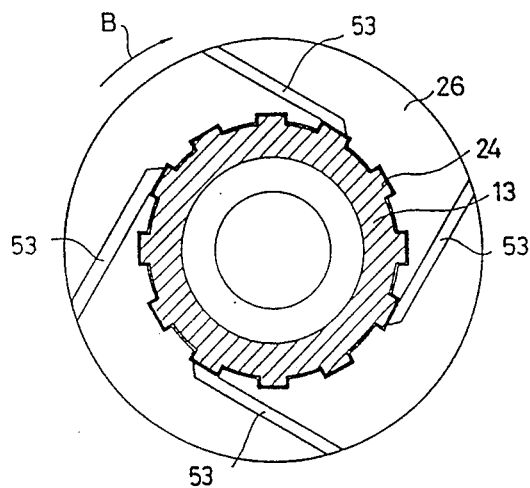
FIGS. 13 and 14 are sectional views taken along line A—A in Fig. 1, showing different arrangements of oil passages formed in an armature.
Figure 14:
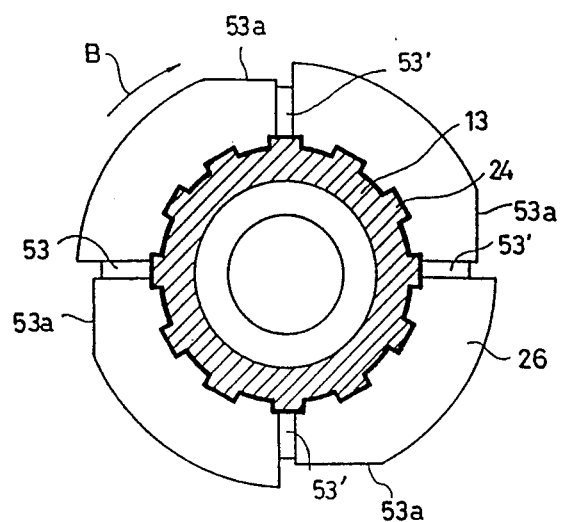

Both armature 26 and hub 13, or at least armature 26, have or has an oil passage through which oil is introduced from the circumferential portion of the oil chamber 21 into the center portion of the oil chamber. As can be seen in FIGS. 1, 13 and 14, armature 26 provided, on its end face adjacent to cover 20, with oil grooves 53 extending from the outer periphery to the inner periphery of armature 26, so that when pulley 15 rotates and when coil 30 is not supplied with power (i.e., in the inoperative position of armature 26), the oil in the circumferential portion of the oil chamber 21 is introduced to the outer periphery of hub 13. The oil grooves 53 are inclined with respect to imaginary radii connecting the outer ends of the oil grooves 53 and the imaginary center of armature 26, so that the open ends (outer ends) of the oil grooves 53 are deviated towards the upstream side of the armature when viewed in direction B (clockwise) of rotation of armature 26 and, according, pulley 15, as shown in FIG. 13. With such an arrangement of oil grooves 53, oil can easily enter the outer open ends of oil grooves 53.

Alternatively, it is possible to provide oil grooves 53' which extend along imaginary radii of armature 26, as shown in FIG. 14. In this alternative, armature 26 has guide recesses 53a which are provided in the vicinity of the outer open ends of oil grooves 53' to be connected to those recesses so that the oil can easily enter the outer open ends of the oil grooves 53'.

Hub 13 has oil introduction grooves 54 and 55 (shown in FIG. 1) which extend substantially radially. Oil introduction grooves 54 and 55 introduce oil, which reaches the center portion of hub 13 through oil groove 53, to splines 24 or oil seal 16.

Oil grooves 53 or 53', guide recesses 53a, and oil introduction grooves 54 and 55 ensure that oil in the circumferential portion of the rotating oil chamber 21 can be introduced to the center portion of that chamber when the coil is not activated. More specifically, oil enclosed in the oil chamber 21 is collected and maintained at the circumferential portion of the oil chamber 21 due to the viscosity of the oil and the centrifugal force produced by the rotation of pulley 15, cover 20 and clutch plates 23 on the driving side. In this state, armature 26 is either still or is slightly rotated by the rotation of the oil. The oil in the circumferential portion of the oil chamber 21 is introduced through oil grooves 53 and 53' into the inner peripheral portion of armature 26 and then into the gap between the associated clutch plates 23 and 25 through the outer peripheries of the splines 24, as shown by arrow C in FIG. 1. Past the outer surface of the hub 13, oil reaches the center portion of the hub and is introduced onto the outer peripheries of the splines 24 through the oil introduction grooves 54 and onto the oil seal 16 through the oil introduction grooves 55, as shown by arrows B in FIG. 1. This is caused by the centrifugal force produced by the rotation of the armature 26 when the clutch plates 23 and 25 are engaged with each other. Thus, oil which is introduced through oil groove 53 in the disengaging position of the clutch device, in which position the clutch plates 23 rotate relative to the clutch plates 25, can lubricate the gap between the clutch plates 23 and 25, the spline grooves 25b of the clutch plates 23, the splines 24, and the oil seal 16. Oil which enters the inner peripheral portions of the clutch plates 23 and 25 is immediately scattered outward due to the centrifugal force of the clutch plates 23, so that the oil lubricates the entire surfaces of the clutch plates 23 and 25 during the outward movement of that oil.

Figure 15:
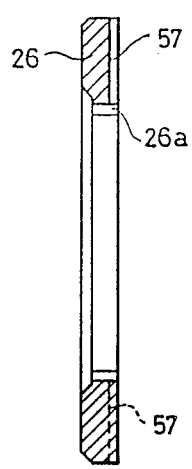
FIGS. 15 and 16 are longitudinal sectional views showing different arrangements of oil passages formed in an armature.
Figure 16:
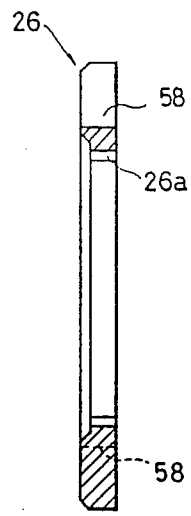

The oil passage formed in armature 26 can also be formed by oil grooves 57 which are provided on the end face of the armature adjacent to clutch plates 23 and 25, as shown in FIG. 15. Alternatively, the oil passage can be formed by axial oil slots 58, as shown in FIG. 16. It should be appreciated that the concept of the inclination of the oil grooves disclosed in FIG. 13, and the concept of the provision of the guide recesses disclosed in FIG. 14, can be applied to the oil grooves 57 shown in FIG. 15 and the axial oil slots shown in FIG. 16 to make the introduction of the oil into the oil grooves or the oil slots easier. It should be noted that although the oil passage is realized by oil grooves 53, 53' or 57 in the above-mentioned embodiments illustrated in FIGS. 13, 14 and 15, the oil passage can be realized by fins (not shown) which are provided on armature 26 and which define oil passage between the fins.

Oil introduction grooves 54 and 55, although preferable for ensuring the introduction of oil onto the inner peripheries of the clutch plates 23 and 25 and the oil seal 16, can be dispensed with, since oil can lubricate the inner peripheries clutch plates 23 and 25 through oil grooves 53, 53', 57, the guide recesses 53a, and/or oil slots 58 without oil introduction grooves 54 and 55.

Hub 13 is made of a nonmagnetic material, such as stainless steel to prevent the leakage of magnetic flux towards the center portion of driven shaft 12 and to thereby provide a large magnetic attactive force. Preferably, hub 13 is subject to a nitriding treatment to have higher abrasion resistance, durability and lubricability.

Figure 17:
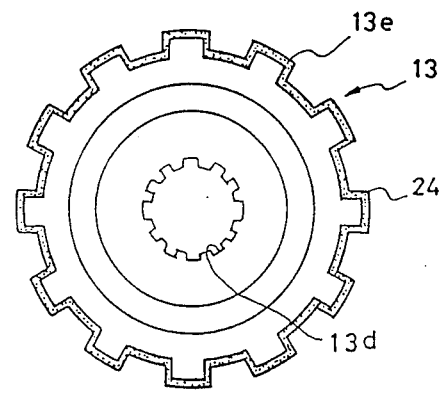
FIGS. 17 and 18, respectively, are a front elevational view and a perspective view of a hub.
Figure 18:
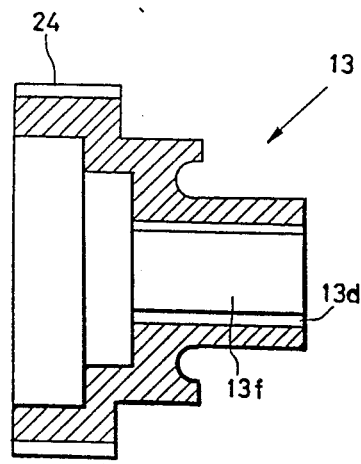

FIGS. 17 and 18 show a single hub 13 which is slightly different from hub 13 shown in FIG. 1. Hub 13 shown in Fig. 1 is split into two portions 13a and 13b. The hub 13 shown in FIGS. 17 and 18 (also in FIGS. 13 and 14), on the other hand, if not divided into two portions. Accordingly, no intermediate rubber 45 (which was present in the embodiment of FIG. 1) is provided. Referring again to FIGS. 17 and 18, hub 13 is provided, on its outer periphery, with splines 24 and on its inner periphery with splines 13c. Hub 13 is connected to the driven shaft 12 by splines 13 c. Hub 13 is subject to nitriding treatment, as mentioned above, to form an outer hard layer 13e which improves the slide efficiency between the splines 25 and the clutch plates 25 on the driven side. More specifically, the hard layer 13e decreases the friction coefficient and possibility of damage to the sliding surfaces of the splines 24 and the clutch plates 25. This results in decreased deformation of clutch plates 25 on the driven side. Hard layer 13e also improves the sliding efficiency between the hub 13 and the oil seal 16, thus avoiding damage to oil seal 16 while having no adverse effect on its sealing ability.

The nitriding treatment referred to herein includes a soft nitriding treatment and an ion-nitriding treatment.

The soft nitriding treatment can be effected in a salt bath soft nitriding process in which, for example, hub 13 of stainless steel can be immersed in a salt bath of cyanate or cyanic acid salt at 550° C. to 570° C. for 1 to 2 hour.

Figure 19:
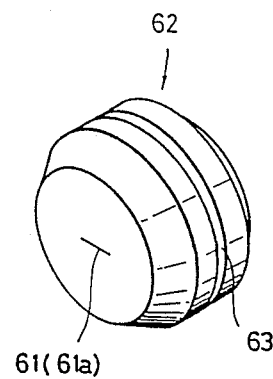
FIG. 19 is a perspective view of a plug adapted to be attached to a cover.

Cover 20 has at its center of rotation an oil feeding oil 60 which is closed by detachably attached sealing plug 62. Plug 62 has an air hole 61 as shown in FIGS. 1 and 19.

Oil feeding hole 60 is formed at the center of rotation of cover 20 so that oil can be fed and enclosed in oil chamber 21 through oil feeding hole 60, regardless of the angular position (phase) of cover 20. If the amount of oil to the enclosed in the oil chamber 21 is above a predetermined value, there is a possibility that an undesirable slip will take place between the clutch plate, resulting in a failure of connection of the clutch plates 23 and 25. On the other hand, if the amount of oil is below a predetermined value, failure of lubrication occurs, resulting in occurrence of so-called melt adhesion. Supposing that the level of the oil feeding hole 60, formed at the center of rotation of cover 20, substantially represents the predetermined amount of oil mentioned above, the oil can be fed into oil chamber 21 unitl the level of the oil surface reaches the oil feeding hole 60 or until it reaches its vicinity of the hole, regardless of the mounting position, that is, the angular position of cover 20.

Plug 62, which is made of an elastically deformable material, such as rubber, had a peripheral annular groove 63 corresponding to oil feeding hole 60. This is so that the portion of cover 20 that defines the oil feeding hole 60 can be fed into angular groove 63 of plug 62 when the latter is mounted to oil feeding hole 60 of cover 20 to close oil chamber 21. Plug 62 can be elastically deformed when it is attached to, and detached from, oil feeding hole 60 of cover 20.

Air hold 61 of plug 62 has a slit 61a and a tapered hole 61b (both shown in FIG. 1) connected to it. The tapered or conical hole 61b which opens into oil chamber 21 has a diameter which gradually increases towards oil chamber 21. Slit 61a is normally closed.

Air hole 61 opens when pressure in the oil chamber 21 is above a predetermined value to release the internal pressure. In the wet clutch device, when pulley 15 rotates, oil in the oil chamber 21 rotates also, producing heat due to, in part, friction between the oil and the oil chamber 21. This heat causes a thermal expansion of the oil and the air enclosed in the oil chamber 21, resulting in an increase of the pressure in the oil chamber 21. This increased internal pressure may have an adverse effect upon oil seal 16 and other elements.

With the arrangement of plug 62 mentioned above, slit 61a opens to release the internal pressure of the oil chamber 21 when the pressure exceeds a predetermined value, that is, when a pressure difference between the outside and inside of the oil chamber 21 is above a predetermined value. It should be noted that when the internal pressure is released through slit 61a during operation of the clutch device, oil is collected at the outer circumferential portion of the oil chamber 21, as mentioned above, and, accordingly, the oil in the oil chamber does not leak out through slit 61a.

It should also be appreciated that foreign matter, such as dust, cannot enter the oil chamber through slit 61a since 61a is normally closed.

Alternatively, it is also possible to provide plug 62 with a very small hole (such as a pinhole) which is permanently opened. This pinhole would be provided in place of normally closed air hole 61a. In this alternative, the internal pressure in the oil chamber 21 can be released by the pinhole which has an extremely small diameter so that foreign matter cannot pass through the pinhole.

Clutch plates 23 on the driving side and clutch plates 25 on the driven side are made of magnetic steel plates having a high rigidity and which are subject to a satin finish. Preferably, each of the clutch plates 23 and 25 is provided, on at least one of their surfaces, with oil discharging grooves 65 (shown in FIGS. 20 to 25) to ensure a stable connection between clutch plates 23 and 25 and to improve friction efficiency between those plates as is explained further below.

SK-5 plates or SPCC plates having about 0.3 mm to 3 mm thickness can be used to make clutch plates 23 and 25. These steel plates can be subject to heat treatment to increase their hardness.

The satin finish referred to herein means a delustering treatment in which a huge number of small non-oriented projections and depressions having about 2 to 10 micrometers of R max (maximum height of irregularities of surface roughness) or less than 20 micrometers and preferably 5 10 of Rz (ten point height irregularities) are uniformly formed on the surfaces of clutch plates 23 and 25. Such formation can be accomplished by a process of roll transfer, shot peening, sandblasting, grinding, electrolytic polishing, plating, or the like. Such a satin finish treatment can prevent the occurrence of an undesirable slip between clutch plates 23 and 25 and can produce enough friction to establish a quick and stable frictional connection between clutch plates 23 and 25. In addition, abrasion resistance can be increased by the satin finish. This is becaust the uniformity of the projections and depressions of the satin finish effectively prevents oil layers from being produced between the clutch plates 23 and 25, so that stable boundary lubrication can be established between those plates.

Figure 23:
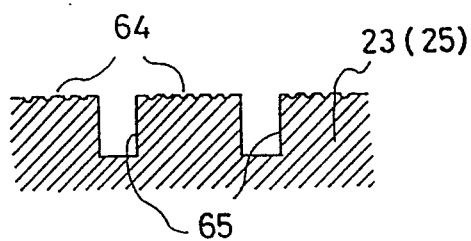
FIG. 23 is a schematic sectional view showing the dimensional relationship between a satin finished surface and oil discharging grooves.

Fig. 23 schematically shows the dimensional relationship between a satin finish surface 64 (projections and depressions) and the oil discharging grooves 65. The schematic of FIG. 23 is offered as an example only.

Figure 20:
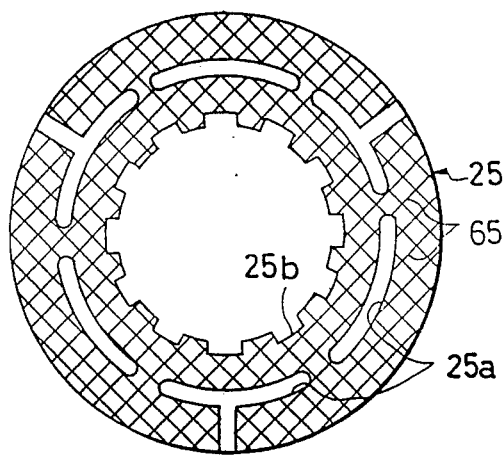
FIGS. 20 and 21, respectively, are a front view and a rear view of a clutch plate on the driven side, showing a pattern of oil discharging grooves formed on that clutch plate.
Figure 21:
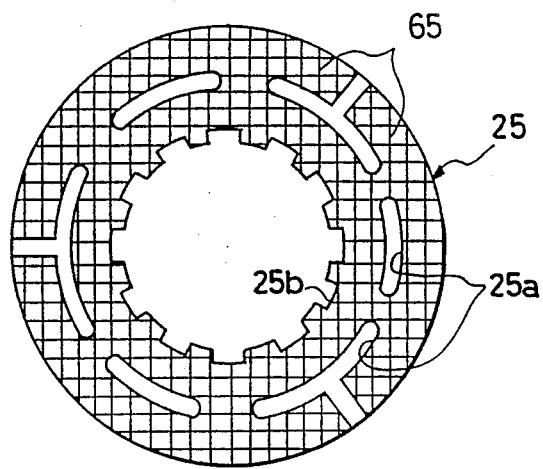

Oil discharging grooves 65 effectively and quickly discharge oil between clutch plates 23 and 25 in a radial outward direction. Oil discharging grooves preferably open into oil chamber 21 at least at their one ends (i.e., outer ends) to discharge oil into oil chamber 21. Preferably, oil discharging grooves 65 are formed on opposite end (side) faces of each of the clutch plates 23 and 25. When the oil discharging grooves 65 are formed on both end faces of the clutch plates 23 and 25, the patterns or phases (positions, directions, and so on) of the oil discharging grooves 65 on the front end faces of the clutch plates 23 and 25 are preferably different from those of the rear end faces of the clutch plates 23 and 25. This is because if the patterns or phases of the oil discharging grooves 65 on both end faces of the clutch plates 23 and 25 are identical, the strength of the clutch plates 23 and 25, which are relatively thin, can be weakened. FIGS. 20 and 21 show different patterns of oil discharging grooves 65 formed on the front end face and the rear end face of clutch plate 25 (or clutch plate 23), respectively. Both the oil discharging grooves 65 on the front and rear end faces shown in FIGS. 20 and 21 are in the form of grids, but have differend directions of grids, so that the pattern of oil discharging grooves 65 on the front end face (FIG. 20) does not coincide with that of the oil discharging grooves 65 on the rear end face (FIG. 21).

Figure 22:
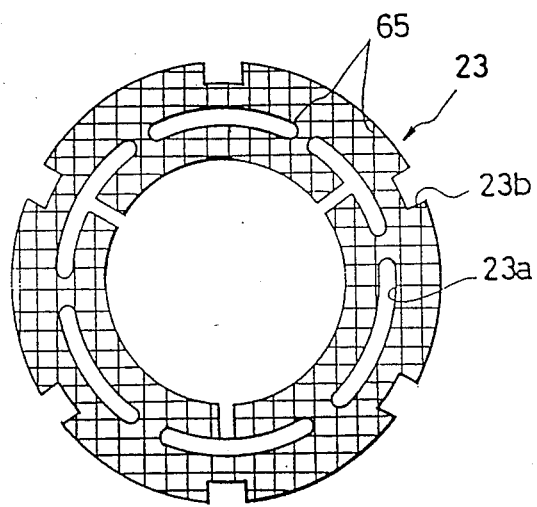
FIG. 22 is a plan view of a clutch plate on the driving side, showing a pattern of oil discharging grooves formed on that clutch plate.
Figure 24:
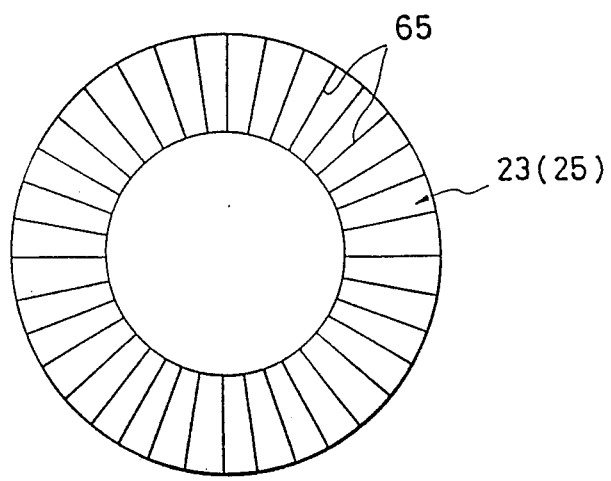
FIGS. 24 and 25 are plan views of different patterns of oil discharging grooves.
Figure 25:
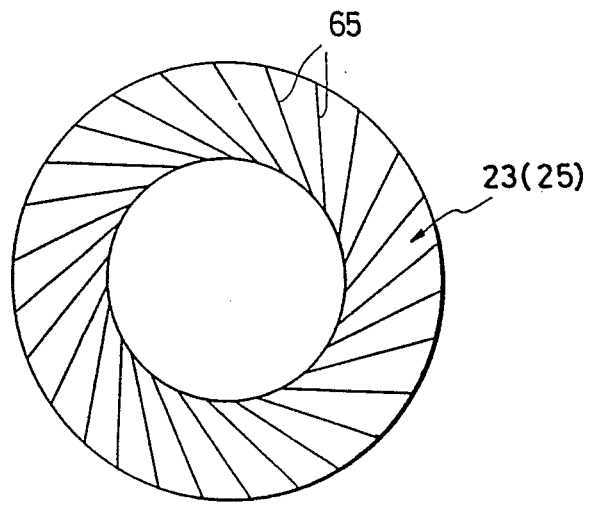

The patterns of the oil discharging grooves 65 are not limited to those shown in FIGS. 20, 21 and 22. FIGS. 24 and 25 schematically show two different patterns of oil discharging grooves 65. In FIG. 24, the oil discharging grooves 65 substantially extend in radial directions. In FIG. 25, the oil discharging grooves 65 are substantially in a spiral arrangement in which the oil discharging grooves 65 are inclined with respect to radial directions. When the identical radial oil discharging grooves 65 shown in FIG. 24 or the identical spiral oil discharging grooves 65 shown in FIG. 25 are formed on both the front and rear end faces of clutch plates 23 or 25, the phases of the patterns are made different from one another to avoid coincidence of the patterns of those grooves.

Good experimental results have been obtained when the width, depth and pitch of oil discharging grooves 65 were 0.1 mm 5 mm, more than 0.1 mm, and 1 5 mm, respectively, and wherein the inner diameters and the outer diameters of clutch plates 23 and 25 were 20 to 150 mm and 40 to 200 mm, respectively.

It has been experimentally confirmed that the nitriding treatment of clutch plates 23 and 25 improves connecting efficiency and abrasion resistance between those plates. Nitriding treatment is generally effected to increase the hardness of material. It has also been found that clutch plates 23 which were subjected to nitriding treatment and clutch plates 25 which were subjected to the nitriding treatment enhanced the boundary lubrication due to the satin finish.

The nitriding treatment referred to herein includes a soft nitriding treatment and an ion nitriding treatment. The soft nitriding treatment of the clutch plates 23 and 25 can be performed in a salt bath soft nitriding process in which steel plates (that is, the clutch plates) are immersed in a salt bath of cyanate or cyanic acid salt at 550° C. to 570° C. for 1 to 2 hours.

Figure 26:
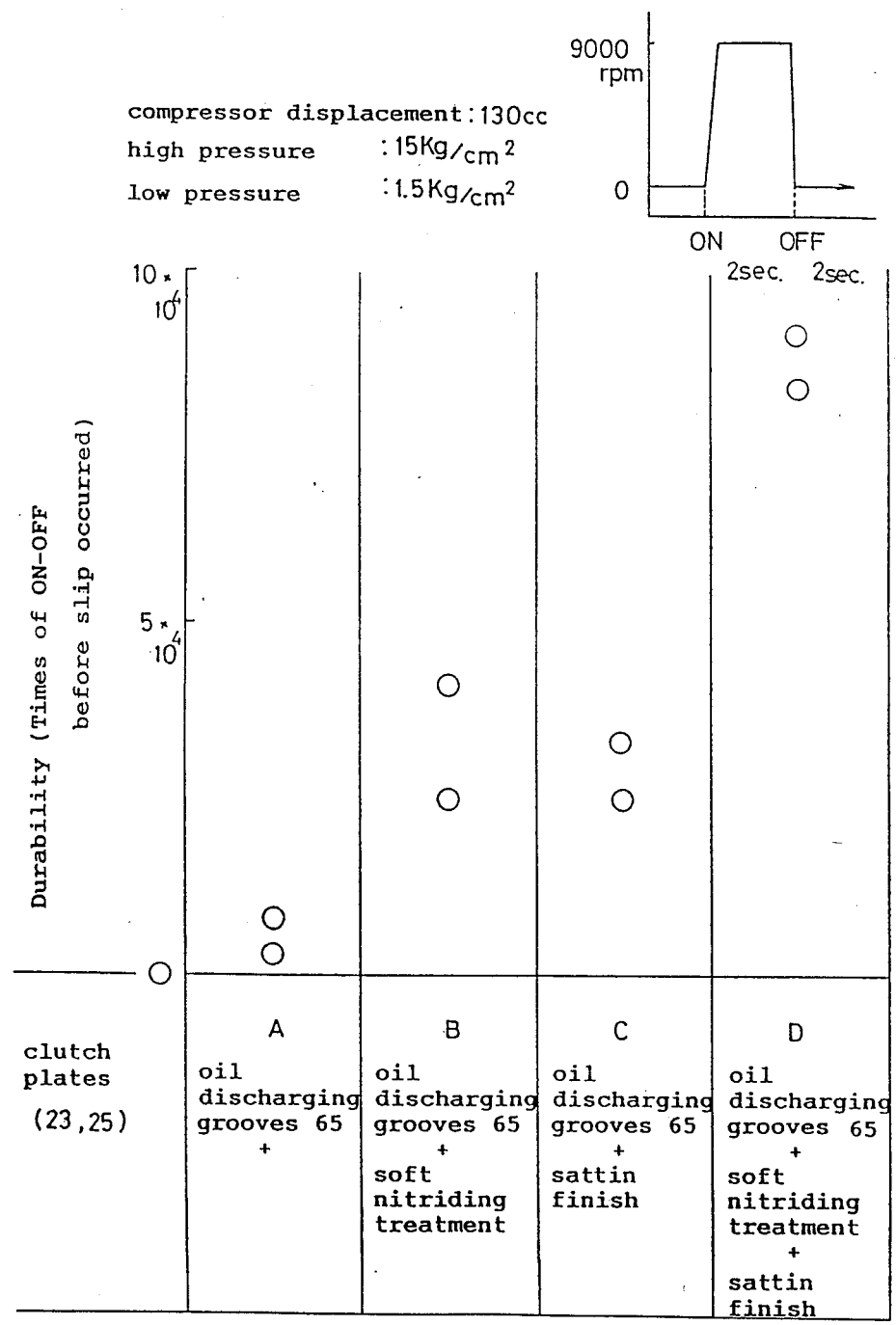
FIG. 26 is a diagram showing experimental results of durability of clutch plates having oil discharging grooves, depending on surface treatments (i.e., a soft nitriding treatment and a satin finish) to which the clutch plates are subjected.

FIG. 26 shows experimental results of times of repeated connection and disconnection (ON or OFF) between the clutch plates 23 and 25 before a slip occurred between those clutch plates, for the following cases (that is, for the following four types of clutch plates):

A. clutch plates 23 and 25 having only oil discharging grooves 65;

B. clutch plates 23 and 25 having oil discharging grooves 65 and having been subjected to soft nitriding treatment;

C. clutch plates 23 and 25 having oil discharging grooves 65 and having been subjected to satin finishing; and D. clutch plates 23 and 25 having oil discharging grooves 65 and having been subject to both soft nitriding treatment and satin finishing.

The experimental conditions were as follows:
compressor displacement: 130 cc
high pressure: 15 Kg/cm$^2$
low pressure: 1.5 Kg/cm$^2$.

It can be seen from the result set forth in FIG. 26 that satin finishing and nitriding treatment effectively increase the durability of the clutch plates. In particular, in the case of the clutch plates 23 and 25 which had oil discharging grooves 65 and which had been subjected to both soft nitriding and satin finishing, a slip occurred only after the connection and disconnection of the clutch plates had been repeated more than about 80,000 or 90,000 times.

Figure 27:
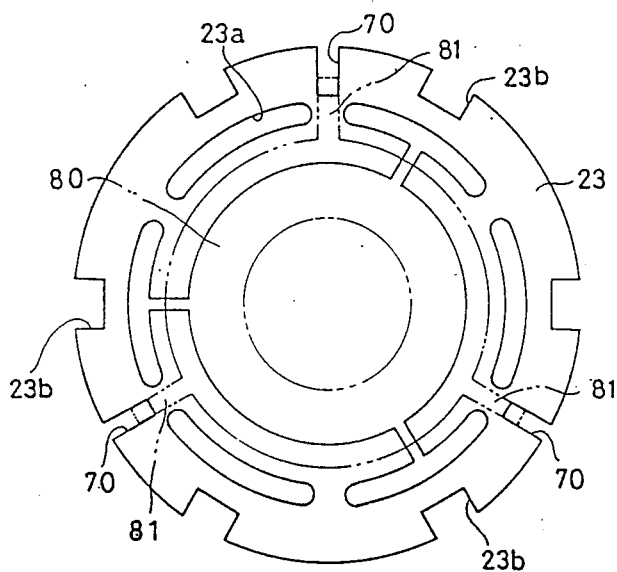
FIG. 27 is a planned view of a clutch plate on the driving side, having positioning grooves on that clutch plate.

It is possible to provide a plurality (preferably three or more) of positioning grooves 70 on the outer periphery of each clutch plate 23 on the driving side, in addition to the above-mentioned radial grooves 23$b$, which serve as a guide means of the associated clutch plate 23, as can be seen in FIG. 27. The positioning grooves 70 facilitate alignment of the radial grooves 23$b$ of a plurality of clutch plates 23 and operative centering of those plates. In the arrangement illustrated in FIG. 27, six radial grooves 23$b$ are spaced at an equiangular distance of 60° on the outer periphery of each clutch plate 23, and three positioning grooves 70 are spaced at an equiangular distance of 120° and located at medians of adjacent radial grooves 23$b$, so that when the positioning grooves 70 of the clutch plates 23 are aligned, the clutch plates 23 automatically have the same center axis and the corresponding radial grooves 23$b$ of the clutch plates 23 can be automatically aligned.

Figure 28:
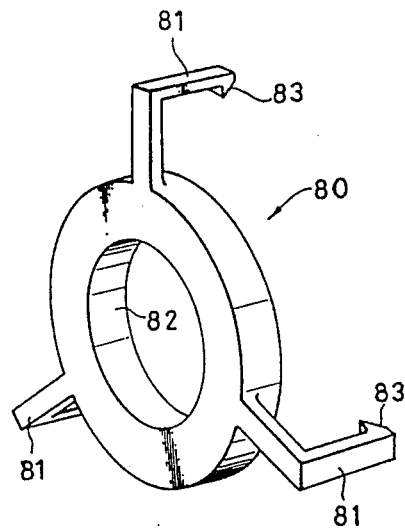
FIG. 28 is a perspective view of a jig which is used to make a subassembly, using the positioning views of the clutch plate on the driving side shown in FIG. 27.
Figure 29:
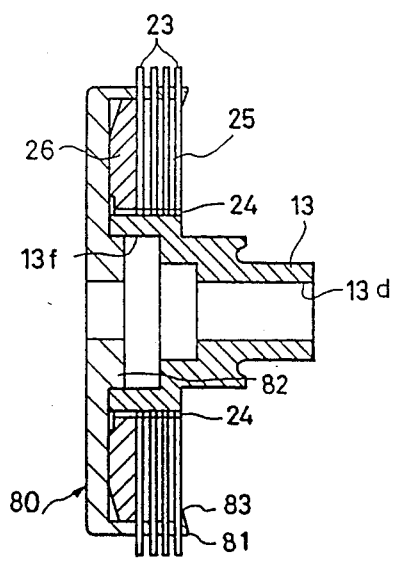
FIG. 29 is a longitudinal sectional view of a subassembly.

Clutch plates 23 and 25 can be assembled with the help of positioning grooves 70. By way of example only, this can be accomplished as follows. Upon assembly, hub 13, which is not yet attached to driven shaft 12, and an assembly jig 80 as shown in FIGS. 28 and 29, are prepared. The assembly jig 80, which can be made of an elastic material such as synthetic resin or the like, has an annular body with three peripheral engagement fingers 81 which can engage corresponding positioning grooves 70. The assembly jig 80 has at its center an annular projection 82 which can be frictionally fitted into the largest diameter portion 13$f$ (FIG. 29) of the stepped center hole of hub 13. The engagement fingers 81 are provided, on their front ends, with inwardly projecting small holding projections 83.

Annular projection 82 of assembly jig 80 is inserted into center hole 13$f$ of hub 13 from one side. Then, armature 26 is inserted into assembly jig 80 from its opposite side, so that armature 26 is fitted onto the splines 24 of hub 13. Then, clutch plates 23 and 25 on the driving side and on the driven side are alternately inserted in the jig assembly 80 and onto the periphery of hub 14. During this insertion, splines 24 are fitted into corresponding spline grooves 25$b$ formed on the inner periphery of each clutch plate 25 on the driven side. Further, the peripheral engagement fingers 81 of jig assembly 80 are fitted into corresponding positioning grooves 70 of each clutch plate 23 on the driving side. The holding projections 83 of engagement fingers 81 of jig assembly 80 come into contact with the clutch plate 23 that is located rightmost in FIG. 29 to prevent clutch plates 23 from coming out of the engagement fingers 81.

FIG. 29 shows a subassembly, that is, the assembly of all the clutch plates 23 and 25 to hub 13 and the jig assembly 80 which is in turn attached to hub 13. In FIG. 29, clutch plates 23 on the driving side are shown correctly centered, and radial grooves 23$b$ of the clutch plates 23 are shown aligned.

The subassembly shown in FIG. 29 (in which hub 13, armature 26, and clutch plates 23 and 25 are firmly held by the assembly jig 80) is incorporated into the clutch device, which device is generally shown in FIG. 1. In greater detail, the inner peripheral connecting splines 13d of hub 13 are fitted onto driven shaft 12 and the radial projections 22 of pulley 15 are fitted into corresponding outer peripheral radial grooves 23b of clutch plates 23. After that, assembly jig 80 is withdrawn and removed to disengage the engagement fingers 81 from the positioning grooves 70 of clutch plates 23. Then, armature 26 is prevented from coming out of hub 13 by stop ring 27, mentioned above, so that the body portion of the clutch device can be completely assembled.

The shape of jig assembly 80 is determined based upon the shape and positions of the positioning grooves 70 of clutch plates 23 on the driving side. The positioning grooves 70 formed in the clutch plates 23 can be replaced with positioning holes to provide centering means for clutch plates 23, as well to provide positioning means for radial grooves 23b thereof.

In the wet clutch device mentioned above, driven shaft 12 can be rotated with a small driving torque due to the viscosity of the oil which is enclosed in the oil chamber 21 and which rotates together with the oil chamber which is in turn rotated by pulley 12, even when clutch plates 23 and 25 are disengaged from one another, under certain conditions. Accordingly, two different output torques can be produced by the wet clutch device of the invention, in accordance with the operational position (engagement) and the inoperative position (disengagement) of the clutch device. This can be used, for example, as a drive of a supercharger in an internal combustion engine, as will be described below with reference to FIG. 30.

Figure 30:
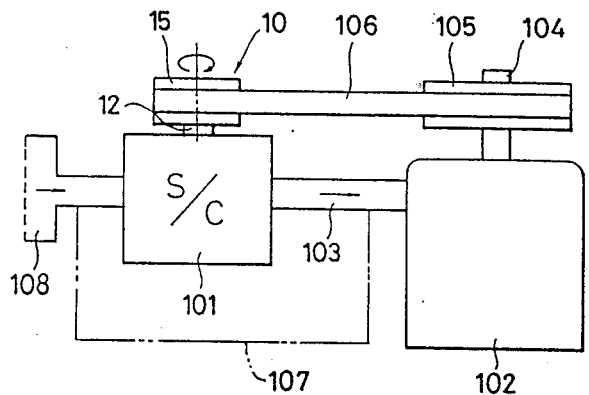
FIG. 30 is a schematic view of a supercharger to which a wet clutch of the present invention is connected.

In the embodiment of the present invention shown in FIG. 30, the wave washers 47 in FIGS. 1 and 7, the annular wave wires 48 in FIG. 8, or the connecting springs 50 in FIGS. 11 and 12 are not used.

Driven shaft 12 of the wet clutch device is connected to a supercharger (mechanical charger) 101, so that shaft 12 can be used as a drive shaft of the supercharger 101. Supercharger 101 is provided in an intake passage 103 of an internal combustion engine 102 to feed a large amount of intake air into the internal combustion engine 102 at a high load (e.g., acceleration) driving condition. Driven shaft 12 of the wet clutch device (i.e., the driving shaft of supercharger 101) is connected to an output shaft 104 of the internal combustion engine 102 through pulley 15 of the wet clutch device, a pulley 105 which is mounted to output shaft 104, and a belt 106 which connects pulleys 15 and 105. It should be noted that in a conventional clutch device, it is necessary to provide a bypass 107 (shown by an imaginary line) which bypasses the supercharger 101 to connect the upstream and downstream sides of the supercharger, so that intake air can be fed to the engine 102 through bypass 107 when the clutch device is disengaged (OFF). However, according to the present invention, since supercharger 101 can be driven with a small torque even when the wet clutch device 10 is inoperative (OFF), as mentioned above, no bypass 107 is necessary in the present invention. In FIG. 30, numeral 108 designates an air filter which is provided in the upstream passage of supercharger 101.

In the above-mentioned embodiment illustrated in FIG. 30, the amount of oil enclosed in oil chamber 21 and the diameters of armature 26 and clutch plates 25 on the driven side are predetermined so that driven shaft 12 can be rotated even when the wet clutch device 10 inoperative. Oil in the oil chamber 21, the outer periphery of which is defined by pulley 15, is collected in the form of annulus into the circumferential portion of oil chamber 21 due to centrifugal force, as mentioned above. Supposing that the inner circumference of the annulus of the collected oil O is represented by OL, as shown in FIG. 1, the outer peripheral portions of armature 26 and driven clutch plates 25 are immersed in oil O, so that when pulley 15 is rotated into the inoperative position of the clutch device, in which position no electrical power is supplied to coil 30, driven shaft 12 can be rotated due to the viscosity of oil through armature 26 and driven clutch plates 25. The amount of oil enclosed in oil chamber 21 is determined by taking into consideration characteristics of both the lubrication of the components of the wet clutch device and the connection of the driving and driven clutch plates 23 and 25.

With the arrangement shown in FIG. 30, when pulley 15 is rotated by the internal combustion engine 102 into the inoperative position of clutch device 10, the oil in oil chamber 21, which rotates together with pulley 15, is collected in the form of annulus in the outer circumferential portion of oil chamber 21. As a result of the rotation of the oil, armature 26 and driven clutch plates 25, which are immersed in oil at the outer circumferential portion of the oil chamber, are rotated by the rotating oil O due to the viscosity of the oil. This results in rotation of driven shaft 12 through hub 13. Consequently, an amount of intake air depending upon the number of revolutions of the supercharger 101, can be fed to the internal combustion engine 102.

Figure 31:
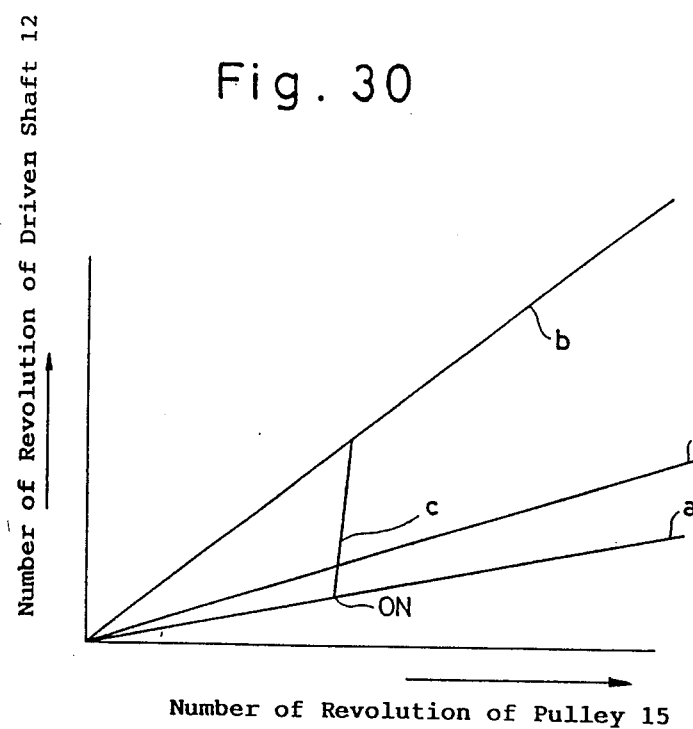
FIG. 31 is a diagram showing the relationship between a number of revolutions of the supercharge and the number of revolutions of the pulley.

FIG. 31 shows the relationship between the number of revolutions of pulley 15 (abscissa) and the number of revolutions of driven shaft 12 (ordinate). In FIG. 31, line "a" represents the number of revolutions of the driven shaft 12 in the inoperative position of clutch device 10, mentioned above.

When coil 30 is energized to bring the clutch device into the operative position, armature 26 is electromagnetically attracted towards pulley 15, so that driving clutch plates 23 are brought into press contact with driven clutch plates 25 to rotate together with those driven clutch plates. As a result, driven shaft 12 is rotated by driven clutch plates 25 through hub 13. Driven shaft 12 and pulley 15 rotate together substantially at the same number of revolutions, so that supercharger 101 can feed an increased amount of intake air to internal combustion engine 102. The increased number of revolutions of driven shaft 12 is represented by line "b" in FIG. 31. Line "c" in FIG. 31 represents change in the number of revolutions of driven shaft 12 between the inoperative position ("a") and operative position ("b") of clutch device 10. The transfer of the number of revolutions of driven shaft 12 from "a" to "b" can be more smoothly effected than a transfer from a stationary position in which the driven shaft 12 is kept still to position "b" (i.e., a "jumping" transfer).

Figure 32:
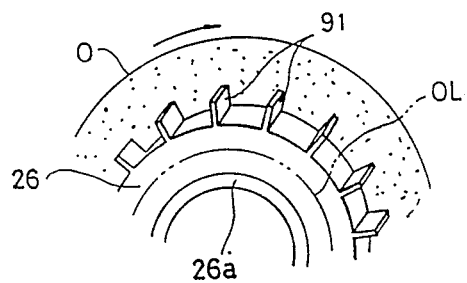
FIGS. 32 and 33 and partial perspective views showing embodiments of fins and grooves which are formed in an armature to increase output torque when clutch plates are disengaged from one another.
Figure 33:
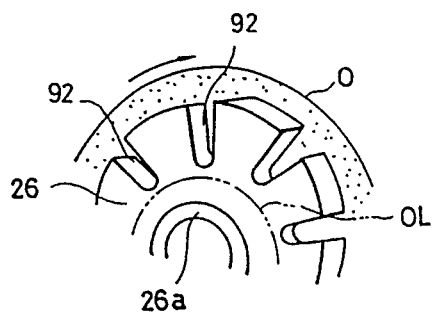

The number of revolutions (output torque) of driven shaft 12 depends on the viscosity of the oil, the degree of immersion of the outer circumferential portions of armature 26 and driven clutch plates 25, and so on. It is possible to provide fins 91 (shown in FIG. 32) or grooves 91 (shown in FIG. 33) on the outer periphery of armature 26 which is immersed in rotating oil O in order to increase the output torque of clutch device 10. Line "a'" in FIG. 31 represents the number of revolutions of driven shaft 12 when fins 91 or grooves 92 are provided on armature 26. As can be seen from the information set forth in FIG. 31, the number of revolutions of driven shaft 12 in the inoperative position of clutch device 10 can be increased from line "a" to line "a'" by providing either fins 91 or grooves 92. The direction and number of fins 91 or grooves 92 can be determined in accordance with the desired torque in the inoperative position of the set clutch device.

Figure 34:
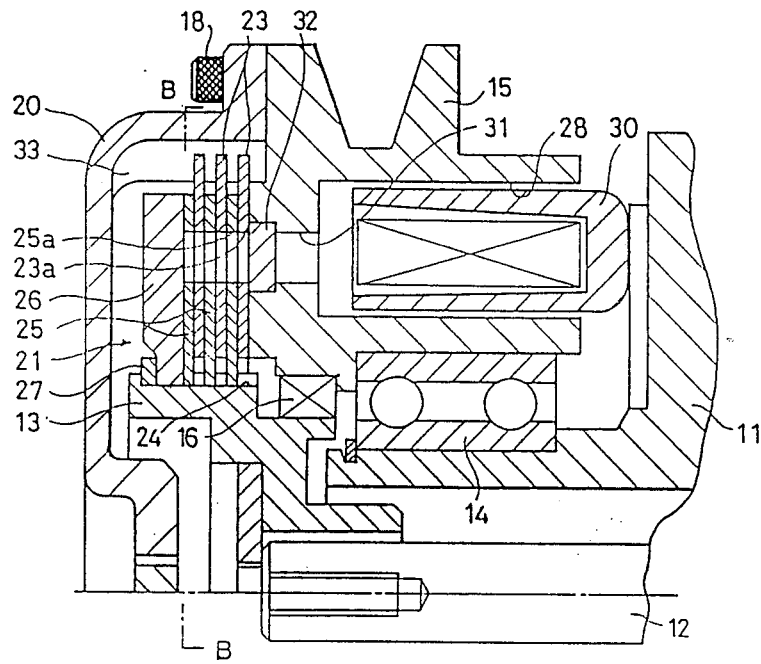
FIG. 34 is a longitudinal sectional view of a wet clutch according to another embodiment of the present invention.
Figure 35:
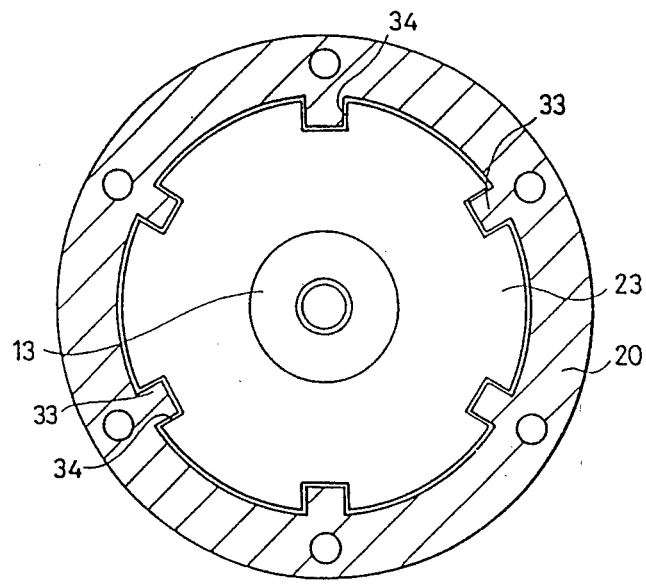
FIG. 35 is a sectonal view taken along line B—B in FIG. 34.

FIGS. 34 and 35 show a modified embodiment of the present invention. In this embodiment, the modification is directed to cover 20 which is secured to pulley 15. More specifically, the supporting means of driving clutch plates 23 is provided on the inner peripheral surface of cover 20. This supporting means has a plurality of radially projecting ridges 33 which extend in the axial direction and, further, this supporting means has a plurality of recessed grooves 34 formed on the outer peripheries of driving clutch plates 23. Radially ridges 33 are fitted into corresponding recessed grooves 34 so that driving clutch plates 23 are movable in the axial direction but are not rotatable relative to cover 20. Thus, driving clutch plates 23 always rotate together with cover 20 and, accordingly, pulley 15.

Figure 36:
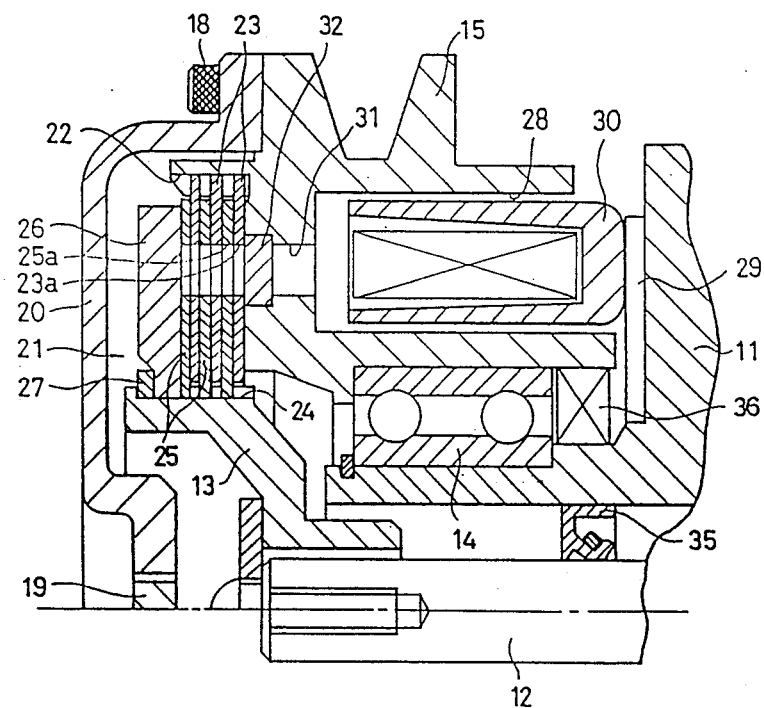
FIGS. 36 and 37 are longitudinal sectional views of wet clutches according to different embodiments of the present invention.

FIG. 36 shown another embodiment of the present invention, in which the modification is addressed to the seal mechanism of oil chamber 21. Generally speaking, a compressor for a car cooler has a seal member 35 between the driven shaft 12 and the housing 11. In this case, oil seal 36 can be provided outside bearing 14 to establish a seal between pulley 15 and hub 13. In comparison with the arrangements shown in FIGS. 1 and 34, in which oil seal 16 is provided inside bearing 14, bearing 14 in this embodiment can be effectively lubricated by oil in oil chamber 21 as shown in FIG. 36.

Figure 37:
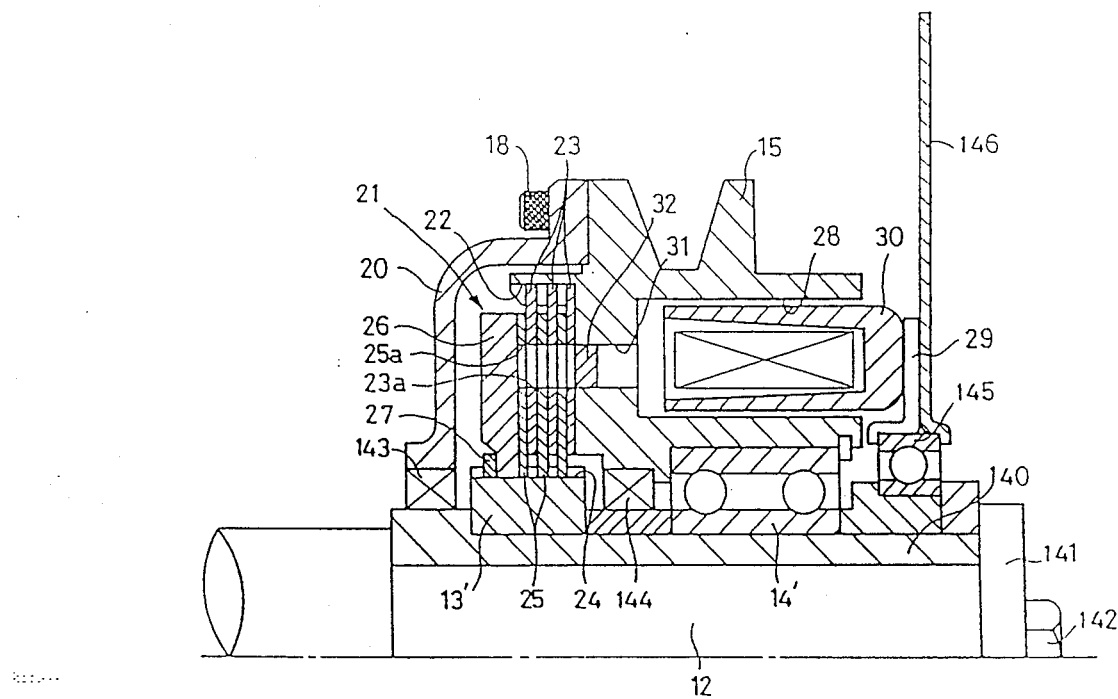

Unlike the embodiment shown in FIG. 36, which is applicable to a compressor of a car cooler, the wet clutch device shown in FIG. 37 is suitable for more general use. In FIG. 37, on the outer periphery of driven shaft 12 is a rotor bush 140 which is secured to driven shaft 12 by a bolt or bolts 142 through a stationary plate 141 so as not to move in the axial direction. Cover 20 is rotatably supported on the outer periphery of rotor bush 140 through an oil seal 143. Pulley 15 is also rotatably supported on the outer periphery of rotor bush 140 through a bearing 14' and an oil seal 144. Hub 13' is keyed onto the outer periphery of rotor bush 140. Oil chamber 21 is defined by pulley 15, cover 20, and hub 13' (driven shaft 12). Driving clutch plates 23, driven clutch plates 25 and armature 26 are supported on hub 13' and pulley 15, similarly to the above-described embodiments. Coil 30 is supported through bracket 29 by a stationary member 146 which is rotatablhy supported on rotor bush 140 through a bearing 145 to prevent coil 30 from rotating about its own axis. This wet clutch device can be used in various applications.

Although it is common to use pulley 15 as a driving member and driven shaft 12 as a driven member, as described above, it is also possible to reverse their uses, that is, to use pulley 15 as a driven member and shaft 12 as a driving member.

Obviously, numerous modifications and variations of this invention are possible in light of the above teachings. It is therefore to be understood that within the scope of the appended claims, the invention may be practiced otherwise than as specifically described.

We claim:

1. A wet clutch device for selectively transmitting the rotation of a rotatable driving member to a rotatable driven member which is rotatable relative to the driving member, said device comprising an oil chamber which is adapted to enclose a predetermined amount of oil and which is defined by the driving and driven members and a cover which is secured to one of the driving and driven members, driving clutch plates which are supported by the driving member so as to move in a predetermined direction in the oil chamber, driven clutch plates which are supported by the driven member so as to move in the same direction as the driving clutch plates in the oil chamber in order to selectively come into engagement with, and disengagement from, the corresponding driving clutch plates, and actuating means for bringing the driving clutch plates and the driven clutch plates into engagement with each other, wherein said actuating means comprises an electromagnetic actuator having a coil which is adapted to be energized to produce a magnetic flux, and an armature which is located in the oil chamber and which is actuated by an electromagnetic attraction produced by the coil in order to bring the driving clutch plates and the driven clutch plates into engagement with each other, wherein said armature comprises an annular plate which has at least one oil passage which extends between an outer peripheral portion and an inner peripheral portion of said plate, said oil passage comprising radial grooves and guide recesses connected to the radial grooves.

2. A wet clutch device according to claim 1, wherein said driving member comprises a pulley and wherein said driven member comprises a driven shaft.

3. A wet clutch device according to claim 2, wherein said driven member has a hub which is secured to the driven shaft.

4. A wet clutch device according to claim 3, wherein said driven clutch plates are movably supported on the hub.

5. A wet clutch device according to claim 3, wherein said hub is made of nonmagnetic material and is subject to a nitriding treatment.

6. A wet clutch device according to claim 3, wherein said hub is made of stainless steel.

7. A wet clutch device according to claim 1, wherein said driving clutch plates and said driven clutch plates are located between the armature and the coil.

8. A wet clutch device according to claim 1, wherein said oil passage is provided on a surface of the armature adjacent to the cover.

9. A wet clutch device according to claim 3, wherein said hub has at least one oil introduction groove which extends radially through the hub.

10. A wet clutch device according to claim 1, wherein said driving clutch plates and said driven clutch plates are made of steel plates which are subject to satin finish.

11. A wet clutch device according to claim 10, wherein said steel plates include side faces and have oil discharging grooves on at least one side face thereof.

12. A wet clutch device according to claim 10, wherein said steel plates are subjected a nitriding treatment.

13. A wet clutch device according to claim 11, wherein said oil discharging grooves have open outer ends.

14. A wet clutch device according to claim 10, wherein said steel plates have oil discharging grooves on both side faces of said plates.

15. A wet clutch device according to claim 14, wherein said oil discharging grooves on both side faces of the steel plates have different patterns.

16. A wet clutch device according to claim 11, wherein said oil discharging grooves are in the form of a grid.

17. A wet clutch device according to claim 1, wherein said driving clutch plates comprise axial guide means for guiding the driving member upon which the driving clutch plates are axially movably supported.

18. A wet clutch device according to claim 17, wherein said driving clutch plates comprise positioning means for aligning the axial guide means.

19. A wet clutch device according to claim 18, wherein said positioning means comprise positioning grooves provided on the outer peripheries of the driving clutch plates.

20. A wet clutch device according to claim 19, wherein said axial guide means comprises guide grooves formed on the outer peripheries of the driving clutch plates and wherein said driving member comprises axially elongated radial projections which can be fitted into the radial grooves of the driving clutch plates.

21. A wet clutch device according to claim 2, wherein said driven shaft is connected to a mechanical supercharger comprising part of an internal combustion engine, wherein the driven shaft serves as a drive shaft of the mechanical supercharger.

22. A wet clutch device according to claim 1, wherein said driving clutch plates have a diameter larger than the diameter of the driven clutch plates, said driving clutch plates further comprising biasing means located between the adjacent driving clutch plates and outside the outer peripheries of the driven clutch plates for biasing the adjacent driving clutch plates to separate said driving clutch plates from one another.

23. A wet clutch device according to claim 22, wherein said biasing means comprise wave washers which separate the adjacent driving clutches at a predetermined distance and which are elastically deformed when the driving clutch plates come into engagement with the driven clutch plates.

24. A wet clutch device according to claim 2, wherein said pulley has separate guide means for movably guiding the driving clutch plates.

25. A wet clutch device according to claim 3, wherein said hub comprises an outer annular plate portion which holds the driving clutch plates, an inner annular plate portion which is connected to the driven shaft, and an intermediate elastic member located between the outer and inner annular plate portions in order to elastically connect the same.

26. A wet clutch device for selectively transmitting the rotation of a pulley, which is rotatably mounted to a driven shaft, to the driven shaft, comprising:
an oil chamber which is defined by the pulley, a driven member which includes the driven shaft and an annular hub connected to the driven shaft, and a cover which is secured to the pulley;
annular driving clutch plates which are supported by the pulley for axial movement in a predetermined direction with respect to the oil chamber;
annular driven clutch plates which are supported by the driven member so as to move in the same direction as the driving clutch plates in order to selectively come into engagement with, and disengagement from corresponding driving clutch plates, said driven clutch plates having a diameter smaller than the diameter of the driving clutch plates;
an armature which is axially movably supported on the hub and which is located between the cover and the clutch plates;
an electromagnetic actuator which magnetically attracts the armature to bring the driving clutch plates and the driven clutch plates into engagement with each other; and
spring means between the adjacent driving clutch plates and outside the outer peripheries of the driven clutch plates for biasing the adjacent driving clutch plates into spaced positions from one another;
said driven member being made of a nonmagnetic material which is subjected to a nitriding treatment;
said driving clutch plates and the driven clutch plates being made of steel plates with a satin finish;
at least one of the driving and driven clutch plates being provided, on at least one side face of said plates with oil discharging grooves;
said driving clutch plates having axial guide means for the pulley and positioning means for aligning the axial guide means of the driving clutch plates;
the diameters of the armature and the driven clutch plates, and the amount of oil to be enclosed in the oil chamber being predetermined so that outer peripheral portions of the armature and the driven clutch plates can be immersed in oil which is collected in the outer peripheral portion of the oil chamber due to centrifugal force produced by rotation of the pulley at an inoperative position of the electromagnetic actuator; and wherein
said cover has an oil feeding hole through which oil can be fed into the oil chamber, said cover being closed by a detachable plug which is provided with an air hole through which the internal pressure of the oil chamber can be released when the internal pressure exceeds a predetermined value.

27. A wet clutch device for selectively transmitting the rotation of a rotatable driving member to a rotatable driven member which is rotatable relative to the driving member, said device comprising an oil chamber which is adapted to enclose a predetermined amount of oil and which is defined by the driving and driven members and a cover which is secured to one of the driving and driven members, driving clutch plates which are supported by the driving member so as to move in a predetermined direction in the oil chamber, driven clutch plates which are supported by the driven member so as to move in the same direction as the driving clutch plates in the oil chamber in order to selectively come into engagement with and disengagement from the corresponding driving clutch plates, and actuating means for bringing the driving clutch plates and the driven clutch plates into engagement with each other, wherein said actuating means comprises an electromagnetic actuator having a coil which is adapted to be energized to produce a magnetic flux, and an armature which is located in the oil chamber and which is actuated by an electromagnetic attraction produced by the coil in order to bring the driving clutch plates and the driven clutch plates into engagement with each other, wherein said armature and said clutch plates are substantially in the form of annular plates which are partially immersed at their outer peripheral portions in oil in the oil chamber when the driving member rotates to rotate the driving clutch plates, so that the oil in the oil chamber is adapted to be collected in a circumferential portion of the oil chamber due to the centrifugal force produced by the rotation of the oil chamber, and wherein said armature is provided, on its outer peripheral portion which is located in the oil collected in the circumferential portion of the oil chamber due to the centrifugal force, with means for assisting rotation of the armature.

28. A wet clutch device according to claim 27, wherein said assisting means comprises grooves provided on the outer periphery of the annular plate of the armature.

29. A wet clutch device for selectively transmitting the rotation of a rotatable driving member to a rotatable driven member which is rotatable relative to the driving member, said device comprising an oil chamber which is adapted to enclose a predetermined amount of oil and which is defined by the driving and driven members and a cover which is secured to one of the driving and driven members, said cover having an oil feeding hole through which the oil can be fed in the oil chamber and a plug which is detachably connected to the oil feeding hole of the cover to close the oil chamber, wherein said plug has an air hole which opens when the internal pressure in the oil chamber is above a predetermined value, driving clutch plates which are supported by the driving member so as to move in a predetermined direction in the oil chamber, driven clutch plates which are supported by the driven member so as to move in the same direction as the driving clutch plates in the oil chamber in order to selectively come into engagement with, and disengagement from the corresponding driving clutch plates, and actuating means for bringing the driving clutch plates and the driven clutch plates into engagement with each other.

30. A wet clutch device according to claim 29, wherein said plug is made of an elastically deformable material.

31. A wet clutch device according to claim 29, wherein said oil feeding hole is formed substantially at the center of rotation of the cover.

32. A wet clutch device according to claim 29, wherein said air hole comprises a conical hole having a diameter increasing toward the oil chamber and a normally closed slit which is connected to the conical hole to connect the inside and outside of the oil chamber.

* * * * *

UNITED STATES PATENT AND TRADEMARK OFFICE
CERTIFICATE OF CORRECTION

PATENT NO. : 4,958,712
DATED : September 25, 1990
INVENTOR(S) : T. SUGANUMA et al.

It is certified that error appears in the above-indentified patent and that said Letters Patent is hereby corrected as shown below:

At column 1, line 12 of the printed patent, after "speaking" insert ---,---.

At column 1, line 14 of the printed patent, change "The" to ---these---.

At column 3, line 67 of the printed patent, after "oil" insert ---in oil---.

At column 4, line 34 of the printed patent, after "13a" delete ---.---.

At column 5, line 12 of the printed patent, change "perdetermined" to ---predetermined---.

At column 5, line 19 or the printed patent, change "side" to ---slide---.

At column 6, line 22 of the printed patent, change "binding" to ---bending---.

At column 9, line 16 of the printed patent, change "oil" (second occurrence) to ---hole---.

At column 10, line 45 of the printed patent, change "becaust" to ---because---.

At column 11, line 8 of the printed patent, change "differend" to ---different---.

At column 14, line is 2 of the printed patent, after "10" insert ---is---.

At column 14, line 5 of the printed patent, before "annulus" insert ---an---.

At column 14, line 24 of the printed patent, before "annulus" insert ---an---.

At column 14, line 29 of the printed patent, change "the" (second occurrence) to ---that---.

At column 15, line 8 of the printed patent, change "set" to ---wet---.

UNITED STATES PATENT AND TRADEMARK OFFICE
CERTIFICATE OF CORRECTION

PATENT NO. : 4,958,712
DATED : September 25, 1990
INVENTOR(S) : T. SUGANUMA et al.

It is certified that error appears in the above-indentified patent and that said Letters Patent is hereby corrected as shown below:

At column 15, lines 53-54 of the printed patent, change "rotatablhy" to ---rotatably---.
At column 16, line 64, (claim 12, line 2) of the printed patent, after "subjected" insert ---to---.

Signed and Sealed this

Seventh Day of February, 1995

Attest:

BRUCE LEHMAN

Attesting Officer     Commissioner of Patents and Trademarks